United States Patent [19]

Mark

[11] 3,917,559

[45] Nov. 4, 1975

[54] FLAME RETARDANT POLYCARBONATE COMPOSITION

[75] Inventor: Victor Mark, Evansville, Ind.

[73] Assignee: General Electric Company, Pittsfield, Mass.

[22] Filed: Dec. 28, 1973

[21] Appl. No.: 429,165

[52] U.S. Cl. .......................................... 260/45.7 S
[51] Int. Cl.² ........................................... C08K 5/42
[58] Field of Search ............................. 260/45.7 S

[56] References Cited
UNITED STATES PATENTS 3,475,372 10/1969 Gable ............................ 260/47 XA
3,775,367 11/1973 Nouvertne' ..................... 260/45.7 S

*Primary Examiner*—Melvyn I. Marquis
*Attorney, Agent, or Firm*—William F. Mufatti; Donald M. Papuga

[57] ABSTRACT

A flame retardant polycarbonate composition comprising in admixture an aromatic carbonate polymer and a flame retardant additive which may be the metal salts of halocycloaliphatic aromatic sulfonic acids.

7 Claims, No Drawings

FLAME RETARDANT POLYCARBONATE COMPOSITION

This invention is directed to a flame retardant polycarbonate composition and in particular an aromatic polycarbonate containing in admixture therewith a particular flame retardant additive which may be the metal salts of halocycloaromatic sulfonic acids.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of a halocycloaliphatic aromatic sulfonic acid and includes mixtures of these. The metal salt employed in the practice of this invention is either the alkali metal or alkaline earth metal salt or mixtures of these metal salts. The metals of these groups are sodium, lithium, potassium, rubidium, cesium, beryllium, magnesium, calcium, strontium and barium.

The halocycloaliphatic aromatic sulfonic acid employed in the practice of this invention is a substituted aromatic sulfonic acid wherein the substituent consists of a thermally stable, halogenated cycloaliphatic radical.

In the practice of this invention, the most active and most readily available, thermally stable halocycloaliphatic substituent is derived from halocyclopentadiene, especially hexachlorocyclopentadiene, hexafluorocyclopentadiene and hexabromocyclopentadiene. There are numerous ways by which halocyclopentadiene can be attached to aromatic nuclei and this is well known to those versed in the well developed chemistry of halocyclopentadienes. The easiest way to add halocyclopentadiene to an aromatic substrate is by the Diels-Alder reaction, as exemplified below:

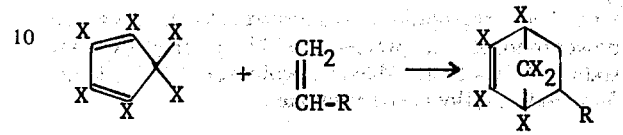

where X is fluorine, chlorine and bromine, and R is an aromatic substituent of 1–4 rings.

Another way to attach the hexahalocyclopentadiene-derived, thermally stable halocycloaliphatic radical to an aromatic ring is available from a variant of the Friedel-Crafts reaction:

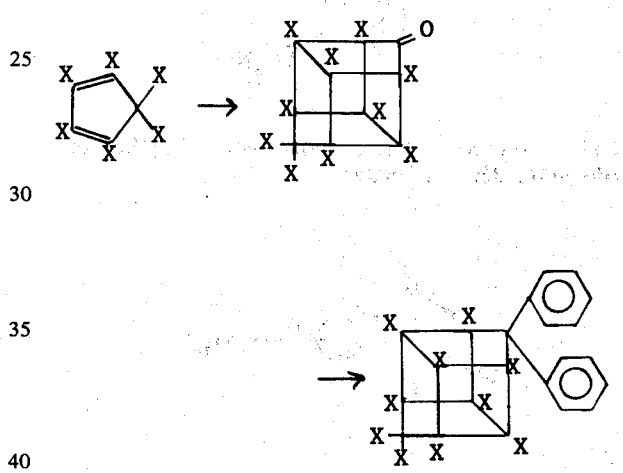

and is documented, e.g., in the following article: B. S. Farah, E. E. Gilbert, P. Lombardi and A. C. Pierce, J. Chem. Eng. Data, 11, 409 (1966).

Another well known halocycloaliphatic substituent that is useful in the practice of this invention is tetrachlorotetra-hydronaphthalene, which on sulfonation and neutralization yields directly the fire retardant metal salt additive.

Accordingly, in the practice of this invention the metal salt of the halocycloaliphatic aromatic sulfonic acid can be best represented by the following formula $R'_m(SO_3M)_nR''_z$ wherein R' may be either:

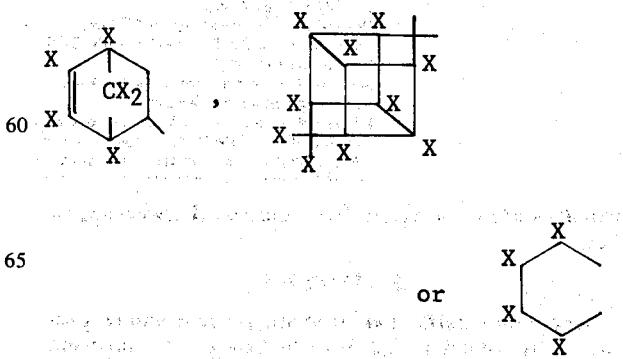

where X is independently selected from fluorine, chlorine or bromine, R'' is an aryl radical of 1-4 aromatic rings, M is a metal which may be selected from the periodic table of either an alkali metal or an alkaline earth metal, m is an integer of 1-2, y is an integer of 1-6 and z is an integer of 1-2.

While there are many compounds that meet the requirements of the above formula and which offer excellent flame retardant characteristics to an aromatic polycarbonate, the preferred additives employed are sodium 4'[1,4,5,6,7,7-hexachlorobicyclo-[2.2.1]-hept-5-en-endo-2-yl]benzenesulfonate

8CH-1975

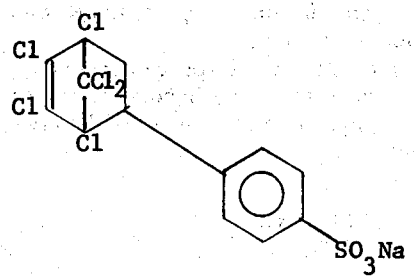

and sodium 1,2,3,4-tetrachloro-1,2,3,4-tetrahydronaphthalene-sulfonate

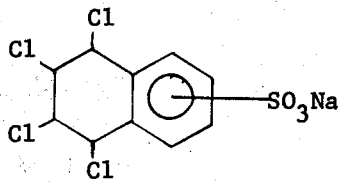

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265°C., and the extrudate is comminuted into pellets.

The pellets are then injection molded at about 315°C. into test bars of about 5 in. by ½ in. by about 1/16-⅛ in. thick. The test bars (five for each additive listed in the Table) are subject to the test procedure set forth in Underwriters Laboratories, Inc. Bulletin UL-94, Burning Test for Classifying Materials. In accordance with this test procedure, materials so investigated are rated either SE-O, SE-I or SE-II based on the results of 5 specimens. The criteria for each SE rating per UL-94 is briefly as follows:

"SE-O": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns." Further, UL-94 requires that all test bars must meet the SE type rating to achieve the particular rating. Otherwise, the five bars receive the rating of the worst single bar. For example, if one bar is classified as SE-II and the other four are classified as SE-O, then the rating for all five bars is SE-II.

The results of the different additives within the scope of the instant invention are as follows with a control being the aromatic polycarbonate as prepared above without the additive of the type set forth herein.

TABLE 1

| Additive (1.0 weight percent) | Flame Out Time Seconds (Avg.) | No. of Drips Per Test Bar | Rating | Remarks |
|---|---|---|---|---|
| CONTROL | 31.6 | 4+ | Burns | |
| Sodium 4'[1,4,5,6,7,7-hexachlorobicyclo[2.2.1]-5-hepten-endo-2-ye]-benzenesulfonate | 4.0 | 1.0 | SE-II | |
| Calcium 2',3'-dichloro-5'[1,4,5,6,7,7-hexachlorobicyclo-[2.2.1]-5-heptenendo-2-ye]benzenesulfonate | 3.9 | 0 | SE-O | |
| Potassium 1',3'-bis[1,4,5,6,7,7-hexachlorobicyclo[2.2.1]-5-heptenendo-2-yl]-benzenesulfonate | 2.6 | 0 | SE-O | |
| Sodium 1,2,3,4-tetrachloro-1,2,3,4-tetrahydronaphthalenesulfonate | 2.4 | 1.0 | SE-II | |
| Disodium 1,1a,3,3a,4,5,5,5a,5b,6-decachlorooctahydro-2,2-diphenyl-1,3,4-metheno-1H-cyclobuta[cd]-pentalenedisulfonate | 5.6 | 1.0 | SE-II | |

EXAMPLE II

This Example is set forth to demonstrate the effect of the flame retardant additives of this invention at the lower limits of 0.01 weight percent based on the weight of the polymer composition.

In preparing the test bars for this Example, 99.99 parts of the polycarbonate of Example I is mixed with 0.01 weight percent of the additives listed in Table 2 employing the same procedure. Test bars are then molded using the same procedure employed in Example I. The test bars are subjected to the same test procedure of Example I with the following results:

TABLE 2

| Additive (0.01 weight percent) | Flame Out Time Seconds (Avg.) | No. of Drips Per Test Bar | Rating | Remarks |
|---|---|---|---|---|
| CONTROL | 31.6 | 4+ | Burns | |
| Sodium 4'[1,4,5,6,7,7-hexachloro-bicyclo[2.2.1]-5-hepten-endo-2-yl]-benzenesulfonate | 8.9 | 3.0 | SE-II | |
| Calcium 2',3'-dichloro-5[1,4,5,6,7,7-hexachlorobicyclo[2.2.1]-5-hepten-endo-2-yl]benzenesulfonate | 9.6 | 4.0 | SE-II | |

EXAMPLE III

This Example is set forth to show the effect of a known commercially available flame retardant additive.

A.

Example I is repeated except that in place of the additives employed therein, only 1 part 1,2,5,6,9,10-hexabromocyclododecane is used herein. The results obtained upon evaluating five test bars are the same as obtained for the Control shown in Table 1 above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

EXAMPLE IV

Example III is repeated except that hexabromobiphenyl is employed herein. The results obtained are essentially the same as those of Example III.

EXAMPLE V

Example III is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted with, but again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of polyhalocycloaliphatic aromatic sulfonic acids and mixtures thereof. The amount of the additives employed in the practice of this invention may vary from 0.01 to up to that amount which after further increasing of such an amount does not materially increase the flame retardant properties of the carbonate polymer. This is generally up to 10 weight percent based on the weight of the aromatic carbonate polymer but may be higher if degradation of the aromatic carbonate polymer does not occur. Also, in some cases, it has been found that above 10 weight percent level, no added advantage in flame retardancy has been observed. The amount of the additive to be employed can also be a function of the degree of flame retardancy desired.

The novelty of the instant invention is achieved by the combination of the sulfonic radical ($SO_3M$) and the polyhalocycloaliphatic radical on the aromatic rings. It is not exactly understood how the additive of this invention functions or how such minor amounts can act as an effective flame retardant for the aromatic carbonate polymer. Analysis of the composition of this invention after being subjected to a fire temperature of about 600°C. showed an unusually high percentage of remaining char. This leads one to hypothesize that the additive may act as a cross-linking agent when the aromatic carbonate polymer is subjected to fire temperatures.

As indicated previously, the additive of the instant invention comprises the alkali or alkaline earth metal salts of polyhalocycloaliphatic aromatic sulfonic acids and includes mixtures of these. While a great number of such salts are set forth in the tables of the Examples of the instant invention, these are only a representative sample of the additives of this invention. The sodium, calcium, magnesium, potassium, strontium, lithium, barium, rubidium and cesium salts of other aromatic sulfonic acids can be employed in place of those of the Examples with the same effective flame retardancy being achieved. These other aromatic sulfonic acids are:

4'[7-Bromo-1,4,5,6,7-pentachlorobicyclo[2.2.1]-5-hepten-endo-2-yl]benzenesulfonic acid

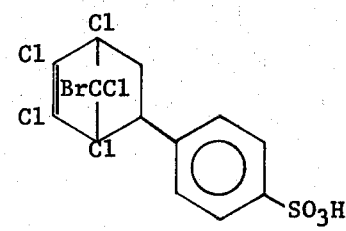

4'[1,4,5,6,7,7-hexabromobicyclo[2.2.1]-5-hepten-endo-2-yl]naphthalene-1'-sulfonic acid

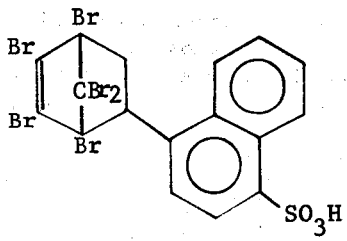

1'[1,4,5,6,7,7-hexafluorobicyclo[2.2.1]-5-hepten-endo-2-yl]-5'[1,4,5,6,7,7-hexachlorobicyclo-[2.2.1]-5-hepten-endo-2-yl]naphthalenedisulfonic acid

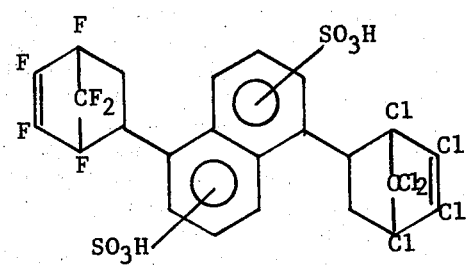

1,2,3,4-tetrachloro-1,2,3,4-tetrahydronaphthalenedisulfonic acid

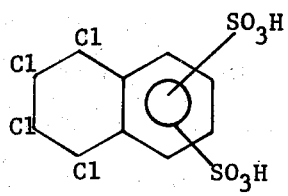

1,1a,3,3a,4,5,5,5a,5b,6-decachlorooctahydro-2,2-bis(-4'-chloro-1'-naphthyl)-1,3,4-methano-1-H-cyclobuta[cd]-pentalenetetrasulfonic acid

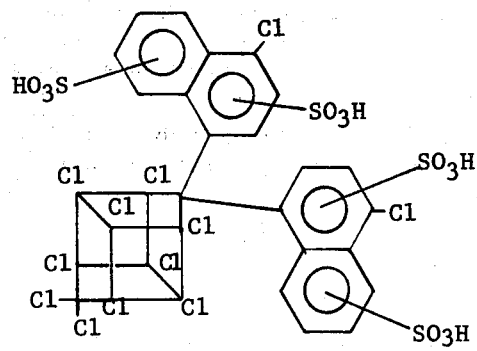

In the practice of this invention, the additive is generally prepared by sulfonation of the polyhalocycloaliphatic aromatic hydrocarbon using either sulfuric acid, chlorosulfonic acid, fuming sulfonic acid or sulfur trioxide. These reactions can be carried out at room temperature or at elevated temperatures such as about 50°C. The salt is then prepared by adding the proper alkaline reagent in sufficient amount to make the neutral salt. The salt is then recovered by precipitation or by distillation of the solvent.

In the practice of this invention, any of the aromatic polycarbonates can be employed herein. However, particularly useful are the aromatic polycarbonates prepared by reacting a dihydric phenol, such as bisphenol-A (2,2'bis(4 hydroxyphenyl) propane) with a carbonate precursor. Typical of some of the dihydric phenols that may be employed in the practice of this invention are bis(4-hydroxyphenyl)methane, 2,2-bis(4-hydroxyphenyl) propane, 2,2-bis(4-hydroxy-3-methylphenyl)-propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane. Other dihydric phenols of the bisphenol type are also available and are disclosed in U.S. Pat. Nos. 2,888,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a minor amount of a flame retardant additive which is the metal salt of a halocycloaliphatic aromatic sulfonic acid, wherein said metal salt thereof is selected from the group consisting of alkali metals and alkaline earth metals, and mixtures of these metal salts, and wherein the halo substituent is selected from the group consisting of bromine, chlorine and fluorine.

2. The composition of claim 1 wherein the metal salt of the halocycloaliphatic aromatic sulfonic acid has the following formula:

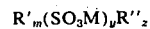

wherein R' is selected from the group consisting of

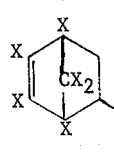 , 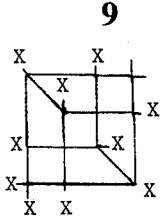 and 

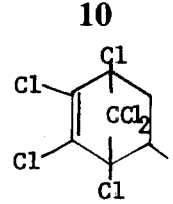

wherein X is independently selected from the group consisting of bromine, chlorine and fluorine, R'' is an aryl radical of 1–4 aromatic rings, M is a metal selected from the group consisting of alkali metals and alkaline earth metals, $m$ is an integer of 1–2, $y$ is an integer of 1–6 and $z$ is an integer of 1–2.

3. The composition of claim 2 wherein $x$ is chlorine.

4. The composition of claim 2 wherein R is

5. The composition of claim 2 wherein R'' is a phenyl radical.

6. The composition of claim 2 wherein M is sodium.

7. The composition of claim 1 wherein the metal salt of a halocycloaliphatic aromatic sulfonic acid is sodium 4'[1,4,-5,6,7,7-hexachlorobicyclo-[2.2.1]-hept-5-en-endo-2-yl]benzenesulfonate.

* * * * *